Patented Oct. 4, 1932

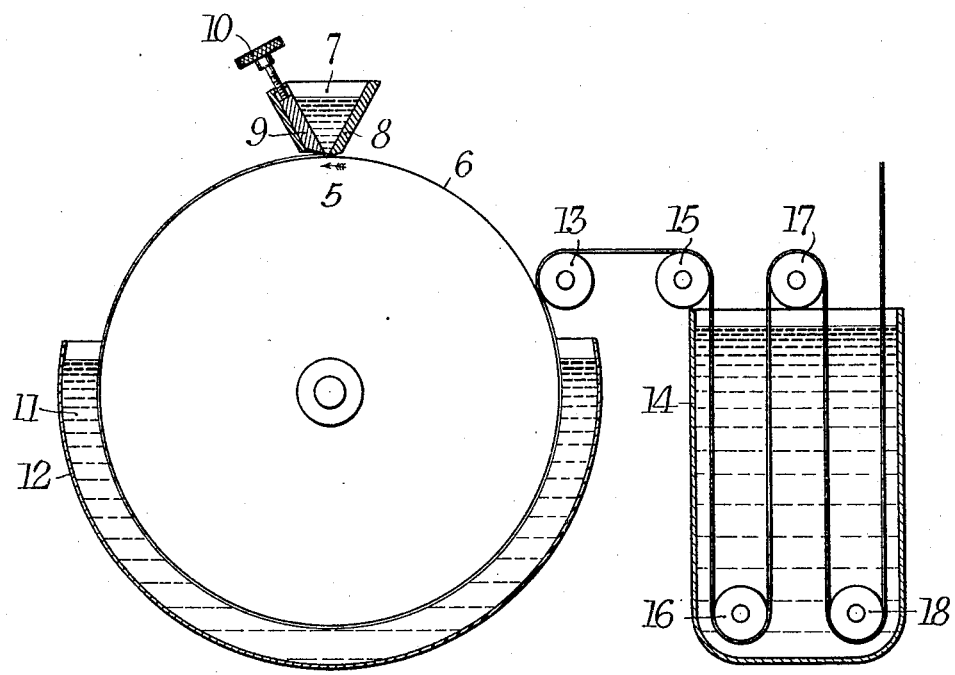

1,880,647

UNITED STATES PATENT OFFICE

CLARENCE L. A. WYND AND WILLIAM H. GROTH, OF ROCHESTER, NEW YORK, ASSIGNORS TO EASTMAN KODAK COMPANY, OF ROCHESTER, NEW YORK, A CORPORATION OF NEW YORK

MANUFACTURE OF FILM

Application filed February 15, 1929. Serial No. 340,238.

This invention relates to the manufacture of film from cellulose esters and more particularly to the rapid and efficient method of coagulating "dope" to produce film therefrom.

Films for photographic and other purposes are prepared by dissolving the esters of cellulose, such as the nitrate and acetate, in suitable solvents either with or without the addition of plastifiers or softeners. The "dope" thus prepared is coated upon a supporting surface and is usually permitted to coagulate or dry in the atmosphere until the resulting film can be stripped from the supporting surface. The film is subjected then to further drying.

The natural coagulation of the "dope" in a free air stream results in a number of disadvantages. The difficulty of solvent recovery, the danger of vapor explosions and the too rapid surface evaporation of the "dope" which results in a case hardened product containing within the case volatile solvents which should have been evaporated and other economical and practical disadvantages are present.

It is the object of the present invention to provide a method in which the dope is coagulated in a liquid medium whereby the hereinabove described disadvantages are eliminated.

We have discovered that the coagulation of "dopes" containing cellulose esters can be expedited by subjecting the thin coating of the "dope" material on a supporting surface to the action of certain coagulating agents, which are not plastifiers or softeners. The coagulation of cellulose ester "dopes" in baths containing plasticizers and softeners is covered in the copending application of Farrow and Carroll Serial No. 347,813, filed March 18, 1929. These materials have the effect of causing the thin coatings of "dope" to harden more rapidly. Consequently, in the commercial manufacture of film material, the machines employed may be operated at higher speeds. The film material produced is nevertheless transparent and flexible and free from flaws and defects and is suitable for the usual commercial applications.

The method may be applied to the coagulation of "dopes" prepared by dissolving cellulose esters in suitable solvents either with or without the addition of plastifiers or softeners in accordance with the usual procedure. A common solvent for both cellulose nitrate and cellulose acetate is acetone, and this or any other volatile solvent may be employed. The common plastifiers or softeners are monochloronaphthalene and tricresyl phosphate. These and other compounds which are adapted to act as plastifiers or softeners may be used in preparing "dopes" for the purpose of the invention.

The method may be practiced simply by coating a suitable supporting surface with a layer of the "dope", the coating being thereafter submerged for a brief interval, for example ten to fifteen minutes, in the coagulating agent. Among the suitable agents which are not softeners or plastifiers are cyclohexanol and tetrachloroethane, ethylene glycol and mixtures of glycerine and methyl alcohol. Cyclohexanol and mixtures of glycerine and methyl alcohol are adapted particularly for the coagulation of cellulose acetate "dopes". Ethylene glycol is a suitable coagulant for both acetate and nitrate "dopes" and tetrachloroethane is adapted particularly for the coagulation of nitrate "dopes". When the coating has been immersed in the coagulant for a sufficient period, the resulting film may be stripped from the supporting surface. The time required will vary depending upon the material used as a coagulant, the character and composition of the "dope", and the thickness of the film. The film should be stripped as soon as it has coagulated sufficiently to permit removal from the supporting surface without stretching or distortion. The film may be suspended in a drying chamber, preferably after washing with a suitable solvent in order to remove the surplus of the coagulant. Ethyl alcohol may be utilized as a solvent. The film will dry as a thin transparent material which may be employed for the purposes to which such films are adapted, for example as a support for light-sensitive emulsions.

In the commercial preparation of films we prefer to manufacture the film as a continuous web by applying a coating of the "dope" to a moving surface such as a rotating wheel or drum. In that case the "dope" is applied to the polished surface of the wheel or drum and is conveyed thereby into a bath of the coagulating agent. As the film advances through the coagulating agent, it hardens and is eventually withdrawn from the bath in the form of a film which can be stripped from the supporting surface. It may be conveyed then through a washing bath and into a drying chamber wherein it is maintained for a sufficient length of time to complete the drying. The film is then wound upon a reel or spool as a finished product.

The invention will be better understood by referring to the accompanying drawing in which we have illustrated diagrammatically a preferred type of apparatus for the manufacture of films commercially in accordance with the invention. It is to be understood that the apparatus is subject to numerous modifications and that other apparatus may be employed in preparing the film.

Referring to the drawing 5 indicates a drum or wheel having a highly polished surface 6, and adapted to be rotated at a suitable speed to permit the coagulation of the film thereon. A trough 7 is provided to receive the "dope". The trough has two lips 8 and 9, the latter being adjustable by means of a screw 10 to permit regulation of the opening between the lips which determines the thickness of the coating applied to the surface 6. As the wheel or drum rotates, the coating is applied continuously and uniformly to the surface and is carried thereby into a bath 11, contained in a casing 12, which may be concentric with the surface of the wheel. The bath may comprise any of the coagulants hereinbefore mentioned or equivalents therefor, that is to say compounds which act as coagulants for the "dope" (and are not plastifiers or softeners). As the film is advanced through the bath it is hardened sufficiently to permit stripping. It passes over a roll 13 after it is stripped from the supporting surface and is delivered to a receptacle 14 containing a suitable washing medium such as ethyl alcohol. In the washing bath the film is guided by rolls 15, 16, 17, and 18. The film is withdrawn from the washing bath continuously and is delivered to a drying compartment (not shown) where it is maintained under suitable atmospheric conditions to effect the drying of the film so that it can be removed continuously as a finished product.

The operation as described may be conducted at ordinary room temperatures, that is to say 20° to 30° C. The "dope" may be supplied continuously to the trough and may be maintained at such a temperature therein as to insure a free flow of the "dope" to the surface of the wheel or drum for the purpose of forming a continuous and uniform coating thereon.

The coagulating agents hereinbefore described are compounds which are readily obtainable and which permit therefore the economical preparation of film material. Commercial grades of these coagulants may be used. If a mixture of glycerine and methyl alcohol is employed, the proportions may be varied depending upon the specific composition of the acetate "dope" but in general we prefer to employ approximately 50% glycerine and 50% methyl-alcohol. Because of the rapid coagulation of the "dope" to form a film, machines employed may be operated at materially higher speeds. The capacity of the machines is thus greatly increased and a very considerable saving is thereby effected.

The exceptional advantages derived from the coagulation of cellulose esters by our process as hereinbefore enumerated are further apparent when ease of solvent recovery, freedom from solvent explosions and other practical and economical improvements are realized. It is self evident that the recovery of the volatile solvents, by mere distillation from the other high boiling constituents of the coagulating bath can be more readily effected than the difficult condensation of vapors from a dilute gaseous vehicle. The less expensive apparatus required for distillation is considerable. Furthermore, the practical elimination of vapor explosions, which is ever present when "dopes" are coagulated by an air stream, is an advantage of far reaching importance.

Various changes may be made in the details of the procedure, the compositions and coagulants employed, and in the apparatus utilized, without departing from the invention or sacrificing any of the advantages thereof.

Having thus described our invention, what we claim as new and desire to secure by Letters Patent is:

The method of preparing cellulose acetate film which comprises forming a film of cellulose acetate "dope" on a supporting surface and immersing the film thus supported in a coagulating bath which comprises acetone, glycerine and methyl alcohol.

Signed at Rochester, New York, this 6th day of Feb., 1929.

CLARENCE L. A. WYND.
WM. H. GROTH.